United States Patent
Makimura

(10) Patent No.: US 10,907,728 B2
(45) Date of Patent: Feb. 2, 2021

(54) SHIFT DEVICE

(71) Applicant: KABUSHIKI KAISHA TOKAI-RIKA-DENKI-SEISAKUSHO, Aichi-ken (JP)

(72) Inventor: Munetoshi Makimura, Aichi-ken (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 48 days.

(21) Appl. No.: 16/217,277

(22) Filed: Dec. 12, 2018

(65) Prior Publication Data

US 2019/0186627 A1 Jun. 20, 2019

(30) Foreign Application Priority Data

Dec. 14, 2017 (JP) ................. 2017-239424

(51) Int. Cl.
*F16H 59/10* (2006.01)
*B60K 20/06* (2006.01)
*F16H 59/02* (2006.01)
*F16H 59/08* (2006.01)

(52) U.S. Cl.
CPC ............ *F16H 59/10* (2013.01); *B60K 20/06* (2013.01); *F16H 59/0278* (2013.01); *F16H 2059/081* (2013.01)

(58) Field of Classification Search
CPC ............... F16H 59/10; F16H 59/0278; F16H 2059/081; F16H 61/24; F16H 61/32; B60K 20/06
See application file for complete search history.

(56) References Cited

U.S. PATENT DOCUMENTS

| | | | | |
|---|---|---|---|---|
| 4,936,431 A | * | 6/1990 | Shinpo | ............... F16H 59/10 137/74 |
| 5,025,678 A | * | 6/1991 | Shinpo | ............... B60K 20/06 180/78 |
| 6,443,026 B1 | * | 9/2002 | Arakawa | ............... B60K 20/06 192/220.2 |
| 8,312,786 B2 | * | 11/2012 | Ueta | ............... F16H 59/0204 74/473.23 |
| 9,145,141 B1 | * | 9/2015 | Kim | ............... B60W 30/18181 |
| 9,677,665 B2 | * | 6/2017 | Patzold | ............... F16H 59/0204 |
| 2004/0123693 A1 | * | 7/2004 | Ogasawara | ............ F16H 59/10 74/473.1 |
| 2006/0016287 A1 | * | 1/2006 | Grossman | ........... F16H 59/0204 74/473.21 |
| 2017/0009876 A1 | * | 1/2017 | Uenomachi | .............. H01H 5/02 |

(Continued)

FOREIGN PATENT DOCUMENTS

JP 08-324282 A 12/1996

*Primary Examiner* — Zakaria Elahmadi
(74) *Attorney, Agent, or Firm* — Roberts Calderon Safran & Cole P.C.

(57) ABSTRACT

A shift lever device includes a shift lever that is rotated in a shift direction to change a shift position, and that is capable of moving in a direction different from the shift direction, a main shaft that rotates when the shift lever is rotated in the shift direction, and a housing that rotatably supports the main shaft. When the main shaft is moved in the direction different from the shift direction, a load is input from the shift lever to the main shaft in the opposite direction from a direction in which the main shaft is displaced from the housing.

9 Claims, 3 Drawing Sheets

(56) References Cited

U.S. PATENT DOCUMENTS

2017/0016529 A1\* 1/2017 Rake ................... F16H 59/0204
2017/0059034 A1\* 3/2017 Makimura .......... F16H 59/0278
2018/0149262 A1\* 5/2018 Insanic ............... F16H 59/0204

\* cited by examiner

SHIFT DEVICE

CROSS-REFERENCE TO RELATED APPLICATION

This application claims priority under 35 USC 119 from Japanese Patent Application No. 2017-239424 filed Dec. 14, 2017, the disclosure of which is incorporated by reference herein.

BACKGROUND

Field of the Invention

The present disclosure relates to a shift device.

Related Art

Japanese Patent Application Laid-Open (JP-A) No. H08-324282 discloses a column shift device in which a select lever is rotated in a shift direction, causing a control shaft coupled to the select lever to rotate and thereby change a shift position. In the column shift device disclosed in the above document, the select lever is also capable of tilting toward a pull direction, this being a direction intersecting the shift direction. The shift position can be changed by rotating the select lever in the shift direction while tilting the shift lever in the pull direction.

However, in a column shift device (shift device) including a select lever (shift body) that is tilted (moved) toward a different direction to a shift direction, such as the column shift device described in JP-A No. H08-324282, it is conceivable that load in a direction in which a control shaft (rotating body) would be displaced from a bracket (support body) supporting the control shaft might be imparted when the shift lever is tilted (moved) in the different direction to the shift direction.

SUMMARY

In consideration of the above circumstances, a shift device is obtained that is capable of suppressing load from acting in a direction in which a rotating body would be displaced from a support body when a shift body is moved in a different direction different from a shift direction.

A shift device according to a first aspect includes: a shift body that is rotated in a shift direction to change a shift position, and that is capable of moving in a direction different from the shift direction; a rotating body that rotates due to the shift body being rotated in the shift direction; and a support body that rotatably supports the rotating body, wherein, when the shift body is moved in the direction different from the shift direction, a load is input from the shift body to the rotating body in an opposite direction from a direction in which the rotating body is displaced from the support body.

A shift device according to a second aspect is the shift device of the first aspect, wherein: a coupling member is fixed to one side of the rotating body in a rotation axis direction of the rotating body; the shift body is attached to the coupling member so as to be capable of moving in the direction different from the shift direction; and due to the shift body being moved and a portion of the shift body abutting the coupling member, the load is input from the shift body to the rotating body through the coupling member in the opposite direction from the direction in which the rotating body is displaced from the support body.

A shift device according to a third aspect is the shift device of the second aspect, wherein: due to the shift body being moved toward one side in the direction different from the shift direction and a first portion of the shift body abutting the coupling member, the load is input from the shift body to the rotating body through the coupling member in the opposite direction from the direction in which the rotating body is displaced from the support body; and due to the shift body being moved toward another side in the direction different from the shift direction and a second portion of the shift body abutting the coupling member, the load is input from the shift body to the rotating body through the coupling member in the opposite direction from the direction in which the rotating body is displaced from the support body.

A shift device according to a fourth aspect is the shift device of any one of the first aspect to the third aspect, wherein movement of the rotating body in the direction in which the rotating body is displaced from the support body is restricted by a threaded member that is screwed together with the rotating body.

A shift device according to a fifth aspect is the shift device of any one of the first aspect to the fourth aspect, wherein: a detection section is supported at the support body, movement of the shift body being detected due to the detection section being moved; when the shift body is moved toward the one side, the detection section is moved by being pressed by the shift body; and the detection section and the shift body are capable of separating from each other when the shift body that has been moved toward the one side returns to the another side.

In the shift device according to the first aspect, the shift position is changed by rotating the shift body in the shift direction. When the shift body is rotated in the shift direction, the rotating body supported by the support body rotates. Note that when the shift body moves in the direction different from the shift direction, a load is input from the shift body to the rotating body in an opposite direction from a direction in which the rotating body is displaced from the support body. This enables load in the direction in which the rotating body is displaced from the support body to be suppressed from occurring.

In the shift device according to the second aspect, when the shift body is moved and the portion of the shift body abuts the coupling member, a load is input from the shift body to the rotating body through the coupling member in the opposite direction from the direction in which the rotating body is displaced from the support body. This thereby enables load in the direction in which the rotating body is displaced from the support body to be suppressed from occurring.

In the shift device according to the third aspect, when the shift body is moved toward the one side in the direction different from the shift direction, the first portion of the shift body abuts the coupling member. Accordingly, a load is input from the shift body to the rotating body through the coupling member in the opposite direction from the direction in which the rotating body is displaced from the support body. When the shift body is moved toward the another side in the direction different from the shift direction, the second portion of the shift body abuts the coupling member. Accordingly, a load is input from the shift body to the rotating body through the coupling member in the opposite direction from the direction in which the rotating body is displaced from the support body. Accordingly, the shift device according to the third aspect enables load in the direction in which the rotating body is displaced from the support body to be suppressed from occurring regardless of whether the shift body is moved toward the one side or moved toward the another side.

In the shift device according to the fourth aspect, the shift body is moved, and the rotating body is input with load from the shift body in the opposite direction from the direction in which the rotating body is displaced from the support body. This thereby enables load in the direction in which the rotating body is displaced from the support body to be suppressed from occurring. Accordingly, this enables the threaded member to be prevented or suppressed from detaching from the rotating body.

In the shift device according to fifth aspect, when the shift body is moved toward the one side, the detection section is moved by being pressed by the shift body. Movement of the shift body is thereby detected. Moreover, the detection section and the shift body are capable of separating from each other when the shift body that has been moved toward the one side returns to the another side. This thereby enables shock to be prevented or suppressed from being imparted to the detection section from the shift body when the shift body that has been moved toward the one side returns to the another side.

BRIEF DESCRIPTION OF THE DRAWINGS

An exemplary embodiment will be described in detail with reference to the following figures, wherein.

DETAILED DESCRIPTION

Figure 1:
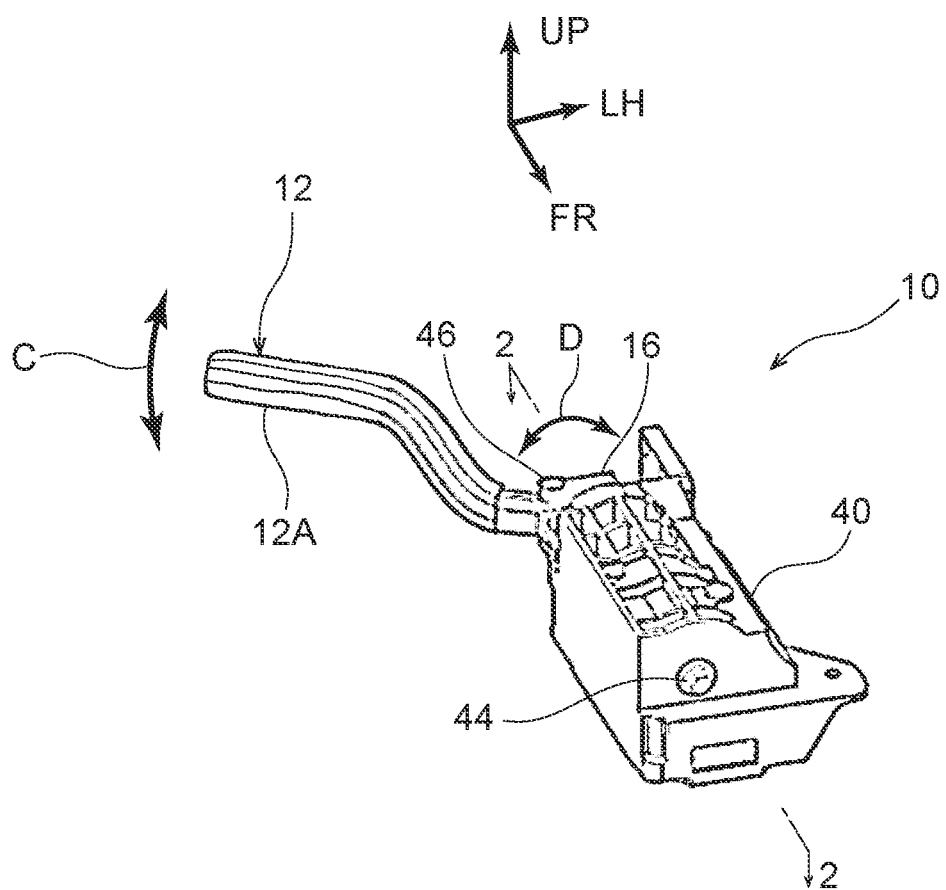
FIG. 1 is a perspective view of a shift lever device, as viewed from the opposite side to a shift lever.

FIG. 1 is a perspective view illustrating a shift lever device 10, serving as a shift device according to an exemplary embodiment, as viewed from the opposite side to a shift lever 12. Note that in the drawings, the arrow FR indicates the front of the shift lever device 10, the arrow LH indicates the left of the shift lever device 10, and the arrow UP indicates the upper side of the shift lever device 10. The front, left, and upper sides of the shift lever device 10 respectively correspond to (are the same as) the front, left, and upper sides of a vehicle.

The shift lever device 10 according to the present exemplary embodiment is what is referred to as a column-type in which the shift lever 12, serving as a shift body, extends to a lateral side of a steering column of the vehicle, and is installed to the steering column of the vehicle.

Figure 2:
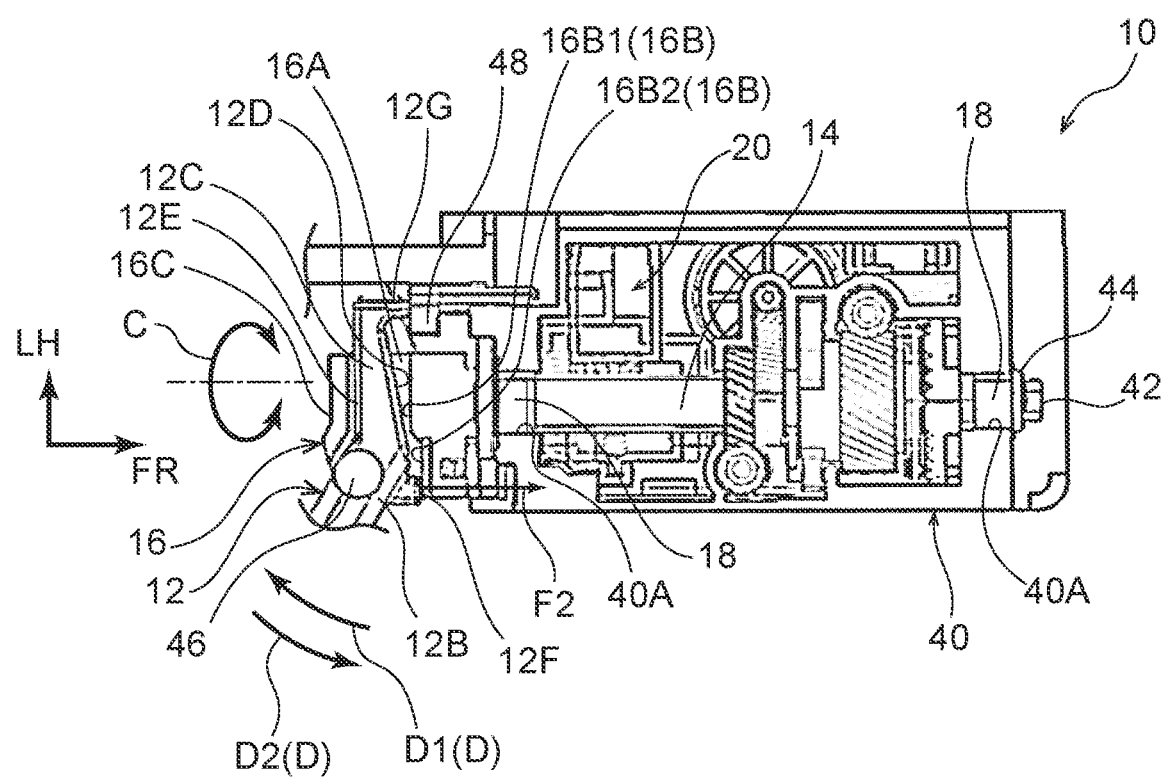
FIG. 2 is a cross-section illustrating a shift lever device sectioned along line 2-2 in FIG. 1, illustrating a state prior to a shift lever being pivoted toward the front side.

As illustrated in FIG. 2, the shift lever device 10 includes a main shaft 14, serving as a rotating body formed in a circular column shape. The shift lever 12 is coupled to one axial direction side (a rear side) end portion of the main shaft 14 through a shift lever coupling member 16, serving as a coupling member. The one axial direction side and another axial direction side (front side) of the main shaft 14 are each rotatably supported by a shaft support portion 40A of housing 40, serving as a support body, through a collar 18. A bolt 42, serving as a threaded member disposed coaxially to the main shaft 14, is screwed together with another axial direction side end portion of the main shaft 14. A catch portion 44 configured by a flange of the bolt 42 or a washer through which the bolt 42 is inserted, for example, catches on a front side portion at a peripheral edge portion of the corresponding shaft support portion 40A of the housing 40, thereby restricting the main shaft 14 from moving toward the one axial direction side with respect to the housing 40.

The shift lever 12 is capable of tilting (rotating) in the up-down direction about an axial center configured by the main shaft 14. An end portion of the shift lever 12 on the opposite side to the side coupled to the shift lever coupling member 16 configures a grip portion 12A that is gripped by an occupant (specifically the driver) of the vehicle. In a state in which the grip portion 12A is being gripped, the shift lever 12 is capable of being tilting-operated in the up-down direction. Shift positions of the shift lever 12 are thereby changed between, for example, a P position, an R position, an N position, and a D position, in this sequence from the upper side to the lower side. Note that direction in which the shift lever 12 is tilted, the direction in which the main shaft 14 is rotated, is referred to as a shift direction C.

Explanation follows regarding detailed configuration of the shift lever 12 and the shift lever coupling member 16, these being relevant portions of the present exemplary embodiment.

As illustrated in FIG. 2, the shift lever 12 includes a coupling portion 12B that is coupled to the shift lever coupling member 16 through a pin 46. Due to the pin 46 being inserted through the coupling portion 12B, the shift lever 12 is capable of being tilted (rotated) in the front-rear direction, this being a different direction to the shift direction C. The coupling portion 12B and the pin 46 are disposed offset toward the grip portion 12A (see FIG. 1) side of the shift lever 12 with respect to an extension of the axial direction of the main shaft 14. Note that the direction in which the shift lever 12 is tilted about the pin 46 is referred to as a release operation direction D. In the present exemplary embodiment, the shift lever 12 is urged toward another side D2 in the release operation direction D by a first urging member, not illustrated in the drawings.

The shift lever 12 also includes a first tilting (rotating) restriction portion 12C extending from the coupling portion 12B toward the opposite side to the grip portion 12A (see FIG. 1). The first tilting restriction portion 12C is formed in a rectangular block shape that narrows on progression toward the opposite side to the coupling portion 12B as viewed along the axial direction of the pin 46. A face on the main shaft 14 side of the first tilting restriction portion 12C is referred to as a first opposing face 12D, and a face on the opposite side of the first tilting restriction portion 12C to the main shaft 14 is referred to as a second opposing face 12E. The first opposing face 12D is disposed on the extension of the axial direction of the main shaft 14.

The shift lever 12 also includes a second tilting restriction portion 12F projecting from the coupling portion 12B toward a radial direction outside of the pin 46 and toward the housing 40 side. The second tilting restriction portion 12F is disposed offset toward the grip portion 12A (see FIG. 1) side of the shift lever 12 with respect to the extension of the axial direction of the main shaft 14.

The shift lever 12 also includes a select link pressing portion 12G projecting toward the housing 40 side from an end portion on the opposite side of the first tilting restriction portion 12C to the coupling portion 12B. A leading end of the select link pressing portion 12G has a curved spherical face profile or circular cylindrical face profile.

The shift lever coupling member 16 includes a shift lever retaining section 16A inside which the coupling portion 12B, the majority of the first tilting restriction portion 12C, and the majority of the second tilting restriction portion 12F of the shift lever 12 are disposed. A tilting (pivoting) range of the shift lever 12 in the release operation direction D is thus restricted due to disposing the coupling portion 12B, the majority of the first tilting restriction portion 12C, and the majority of the second tilting restriction portion 12F of the shift lever 12 inside the shift lever retaining section 16A.

Specifically, the shift lever coupling member 16 includes a restricting wall portion 16B disposed so as to oppose the first opposing face 12D of the first tilting restriction portion 12C and the second tilting restriction portion 12F of the shift lever 12 in the axial direction of the main shaft 14.

Figure 3:
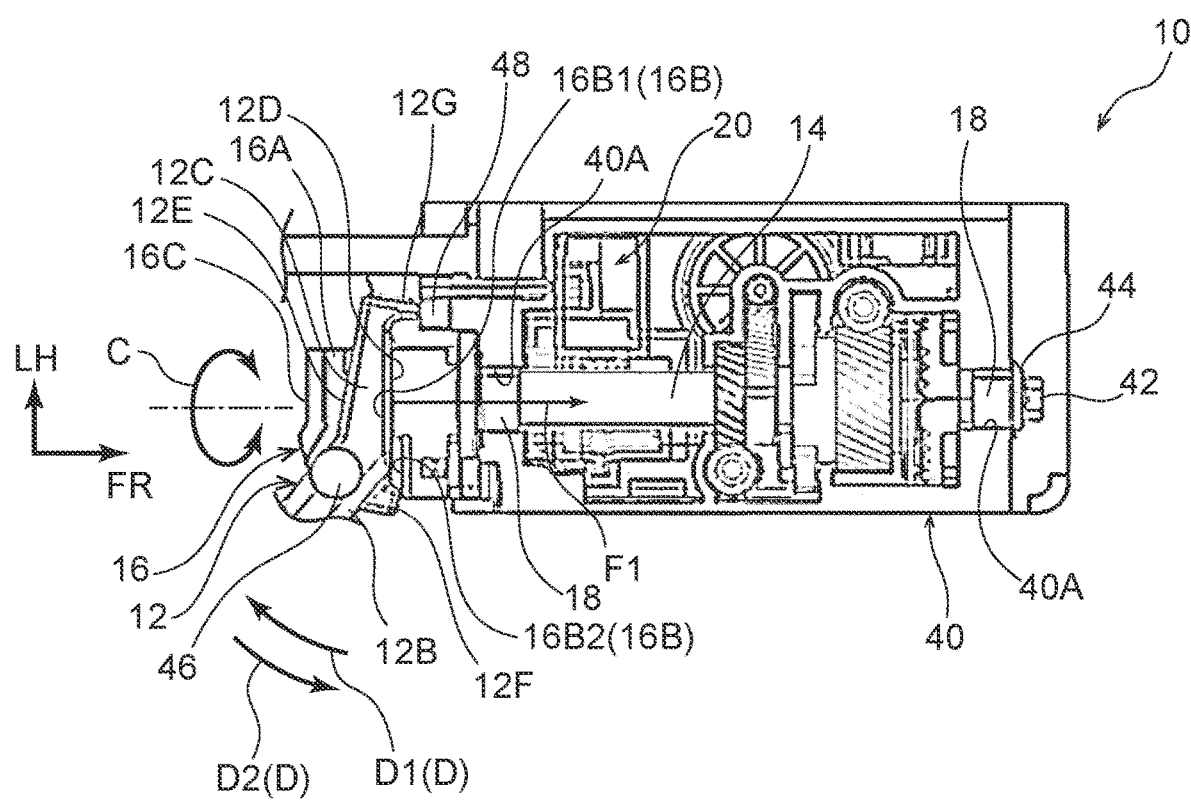
FIG. 3 is a cross-section of a shift lever device corresponding to FIG. 2, illustrating a state in which a shift lever has been pivoted toward the front side.

As illustrated in FIG. 3, when the shift lever 12 is tilted (pivoted) toward one side D1 in the release operation direction D, due to the first opposing face 12D of the first tilting restriction portion 12C abutting the restricting wall portion 16B, the shift lever 12 is prevented from tilting (pivoting) further toward the one side D1 in the release operation direction D.

As illustrated in FIG. 2, when the shift lever 12 is tilted (pivoted) toward the another side D2 in the release operation direction D, due to the second tilting restriction portion 12F abutting the restricting wall portion 16B, the shift lever 12 is prevented from tilting (pivoting) further toward the another side D2 in the release operation direction D.

Note that in the present exemplary embodiment, a portion 16B1 of the restricting wall portion 16B, that is abutted by the first opposing face 12D of the first tilting restriction portion 12C, is offset toward the one axial direction side of the main shaft 14 with respect to a portion 16B2 of the restricting wall portion 16B, that is abutted by the second tilting restriction portion 12F.

The shift lever coupling member 16 also includes a covering wall portion 16C that is disposed opposing the second opposing face 12E of the first tilting restriction portion 12C of the shift lever 12 in the axial direction of the main shaft 14. The covering wall portion 16C and the second opposing face 12E of the first tilting restriction portion 12C are always separated from each other, regardless of the tilt (pivot) angle of the shift lever 12 in the release operation direction D.

In the present exemplary embodiment, a select link 48, serving as a detection section for detecting whether or not the shift lever 12 is tilted (pivoted) toward the one side D1 in the release operation direction D, is provided. The select link 48 is supported by the housing 40 and is capable of moving along the axial direction of the main shaft 14. Due to the select link 48 being pressed by the select link pressing portion 12G of the shift lever 12 and thereby being moved toward the another axial direction side of the main shaft 14, the tilting of the shift lever 12 toward the one side D1 in the release operation direction D is detected. In a state in which the shift lever 12 is positioned at a predetermined shift position (such as the P position) and in which a the shift lever 12 has not been tilted toward the one side D1 in the release operation direction D, the shift lever 12 is prevented from tilting in the shift direction C by a shift locking mechanism 20. In a case in which tilting of the shift lever 12 toward the one side D1 in the release operation direction D has been detected and a predetermined operation (such as a braking operation) has been performed, the shift locking mechanism 20 releases the prevention on the shift lever 12 from tilting in the shift direction C. Note that the select link 48 is urged toward the side of the select link pressing portion 12G of the shift lever 12 by a second urging member, not illustrated in the drawings.

Operation and Advantageous Effects of Present Exemplary Embodiment

Explanation follows regarding operation and advantageous effects of the present exemplary embodiment.

As illustrated in FIG. 1, in the shift lever device 10 with the above configuration, the shift lever 12 is tilt-operated in the shift direction C so as to change the shift position between the P position, the R position, the N position, and the D position.

Note that as illustrated in FIG. 2, in a state in which the shift lever 12 (the shift position thereof) has been disposed at the P position and a state in which the shift lever 12 has not been tilted toward the one side D1 in the release operation direction D (a state in which the grip portion 12A of the shift lever 12 is not being gripped), the shift lever 12 is prevented from tilting in the shift direction C by the shift locking mechanism 20.

As illustrated in FIG. 3, when an occupant of the vehicle grips the grip portion 12A of the shift lever 12 and tilts (pivots) the shift lever 12 toward the one side D1 in the release operation direction D, the select link 48 is pressed by the select link pressing portion 12G of the shift lever 12 and is thereby moved toward the another axial direction side of the main shaft 14. The shift lever 12 is thereby detected to have tilted (pivoted) toward the one side D1 in the release operation direction D. Due to the first opposing face 12D of the first tilting restriction portion 12C abutting the restricting wall portion 16B, the shift lever 12 is prevented from tilting toward the one side D1 in the release operation direction D. In this state, a load F1 toward the another axial direction side is input from the shift lever 12 to the main shaft 14 through the shift lever coupling member 16. When the brake is operated in the state in which the shift lever 12 has been tilted toward the one side D1 in the release operation direction D, the shift locking mechanism 20 releases the prevention on the shift lever 12 from tilting in the shift direction C. The shift lever 12 is therefore capable of being tilted from the P position to the R position, the N position, and the D position.

When the occupant of the vehicle releases the grip portion 12A of the shift lever 12, as illustrated in FIG. 2, the shift lever 12 is tilted toward the another side D2 in the release operation direction D by the urging force of the first urging member, not illustrated in the drawings. Due to the second tilting restriction portion 12F abutting the restricting wall portion 16B, the shift lever 12 is prevented from tilting toward the another side D2 in the release operation direction D. Note that a load F2 occurring when the second tilting restriction portion 12F abuts the restricting wall portion 16B (a load toward the another axial direction side input from the shift lever 12 to the main shaft 14) is input to the main shaft 14 through the shift lever coupling member 16.

As explained above, in the shift lever device 10 of the present exemplary embodiment, both in the case in which the shift lever 12 has been tilted toward the one side D1 in the release operation direction D and in the case in which the shift lever 12 has been tilted toward the another side D2 in the release operation direction D, the load F1 (load F2) toward the another axial direction side is input from the shift lever 12 to the main shaft 14 through the shift lever coupling member 16. Due thereto, load in a direction in which the bolt 42 would come out from the main shaft 14 (a direction in which the main shaft 14 configuring the rotating body would be displaced with respect to the housing 40 configuring the support body) does not occur in the main shaft 14. Detachment of the bolt 42 from the main shaft 14 can therefore be suppressed.

When the occupant of the vehicle releases the grip portion 12A of the shift lever 12, the shift lever 12 is tilted toward the another side D2 in the release operation direction D by the urging force of the first urging member, not illustrated in the drawings. Accompanying this action, the select link 48 is moved toward the one axial direction side of the main shaft 14 by the urging force of the second urging member, not illustrated in the drawings. Note that when the shift lever 12 is tilted (pivoted) rapidly toward the another side D2 in the release operation direction D, the select link pressing portion 12G of the shift lever 12 and the select link 48 separate from each other. Thus, even if the shift lever 12 is tilted rapidly toward the another side D2 in the release operation direction D and is then stopped, shock can be prevented or suppressed from being imparted to the select link 48.

As illustrated in FIG. 2 and FIG. 3, in the present exemplary embodiment, as the shift lever 12 is tilted toward the one side D1 in the release operation direction D, an angle at which (a direction in which) the select link pressing portion 12G of the shift lever 12 presses the select link 48 is inclined with respect to the movement direction of the select link 48 (the axial direction of the main shaft 14). This enables the input of excessive load to the select link 48 from the select link pressing portion 12G of the shift lever 12 to be prevented or suppressed.

Note that although in the present exemplary embodiment an example has been given in which the select link pressing portion 12G of the shift lever 12 and the select link 48 are structured so as to be capable of separating from each other, but not limited thereto. Whether or not to structure the select link pressing portion 12G of the shift lever 12 and the select link 48 so as to be capable of separating from each other may be decided as appropriate according to factors such as the shock-loading resistance of a sensor provided to the select link 48.

Moreover, although the present exemplary embodiment is configured such that the load F1 (load F2) toward the another axial direction side is input from the shift lever 12 to the main shaft 14 both in the case in which the shift lever 12 has been tilted toward the one side D1 in the release operation direction D and in the case in which the shift lever 12 has been tilted toward the another side D2 in the release operation direction D, but not limited thereto. For example, a configuration may be applied in which the load F1 (load F2) toward the another axial direction side is only input from the shift lever 12 to the main shaft 14 either in the case in which the shift lever 12 has been tilted toward the one side D1 in the release operation direction D, or in the case in which the shift lever 12 has been tilted toward the another side D2 in the release operation direction D.

Moreover, although in the present exemplary embodiment an example has been given in which the bolt 42 is screwed together with the main shaft 14 so as to restrict the main shaft 14 from moving toward the one axial direction side with respect to the housing 40, but not limited thereto. Even in configurations in which a threaded member such as the bolt 42 is not used, it is sufficient that load in the opposite direction from a direction in which the main shaft 14 is displaced from (with respect to) the housing 40 is input from the shift lever 12 to the main shaft 14.

The exemplary embodiment has been described above. However, the present disclosure is not limited to the above exemplary embodiment, and obviously various other modifications may be implemented within a range not departing from the spirit of the present disclosure.

What is claimed is:

1. A shift device comprising:
a shift body that is rotated along a shift direction to change a shift position, and that is capable of moving along outward and inward tilting directions different from the shift direction, the shift body having a grip portion at one end, and a coupling portion and first and second contacting portions at another end;
a rotating body that rotates due to the shift body being rotated along the shift direction;
a support body that rotatably supports the rotating body, a distal end of the rotating body connected to a distal end of the support body, and
a coupling member that is provided at a proximal end of the rotating body in a rotation axis direction of the rotating body, and at which the coupling portion of the shift body is pivotally connected;
wherein, the pivotal connection is configured such that
when the shift body is moved along the outward tilting direction, a first load is input from the first contacting portion of the shift body to the rotating body through the coupling member in a first direction toward the distal end of the support body; and
when the shift body is moved toward the inward tilting direction, a second load is input from the second contacting portion of the shift body to the rotating body through the coupling member in the first direction toward the distal end of the support body.

2. The shift device of claim 1, wherein:
the coupling member is fixed to the one side of the rotating body; and
a tilting axis portion about which the shift body is capable of outwardly and inwardly tilting couples the shift body and the coupling member.

3. The shift device of claim 1, wherein movement of the rotating body in an axial direction relative to the support body is restricted by a threaded member that is screwed together with the rotating body which forms the connection between the rotating body and support body.

4. The shift device of claim 2, wherein movement of the rotating body in an axial direction relative to the support body is restricted by a threaded member that is screwed together with the rotating body which forms the connection between the rotating body and support body.

5. The shift device of claim 1, wherein: a detection section is supported at the support body, movement of the shift body being detected due to the detection section being moved; when the shift body is moved toward the one side, the detection section is moved by being pressed by the shift body; and the detection section and the shift body are capable of separating from each other when the shift body that has been moved toward the one side returns to the another side.

6. The shift device of claim 2, wherein: a detection section is supported at the support body, movement of the shift body being detected due to the detection section being moved; when the shift body is moved toward the one side, the detection section is moved by being pressed by the shift body; and the detection section and the shift body are capable of separating from each other when the shift body that has been moved toward the one side returns to the another side.

7. The shift device of claim 1, wherein the first and second contacting portions of the shift body each have one side face facing the coupling member provided at the rotating body and another face facing opposite to the coupling member, and due to the shift body being moved along the outward tilting direction, the face of the first contacting portion facing the rotating body inputs the first load to the rotating body via the coupling member in the first direction, and due to the shift body being moved along the inward tilting direction, the face of the second contacting portion facing the rotating body inputs the second load to the rotating body via the coupling member in the first direction.

8. The shift device of claim 7, wherein:
due to the one side face of the first contacting portion of the shift body abutting the coupling member, the shift body is prevented from moving in the outward tilting direction, and
due to the one side face of the second contacting portion of the shift body abutting the coupling member, the shift body is prevented from moving in the inward tilting direction.

9. The shift device of claim 7, wherein:
due to the shift body being moved in the outward tilting direction and the one side face of the first contacting portion of the shift body abutting a first location of the coupling member but the one side face of the second contacting portion separating from a second location of the coupling member, the first load is input from the shift body to the rotating body through the coupling member in the first direction, and
due to the shift body being moved in the inward tilting direction and the one side face of the second contacting portion of the shift body abutting the second location of the coupling member but the one side face of the first contacting portion separating from the first location of the coupling member, the second load is input from the shift body to the rotating body through the coupling member in the first direction.

* * * * *